United States Patent [19]

Fecik et al.

[11] Patent Number: 4,539,031
[45] Date of Patent: Sep. 3, 1985

[54] APPARATUS FOR PRESS SHAPING HOT GLASS SHEETS

[75] Inventors: Michael T. Fecik, Pittsburgh; Terry A. Bennett, Verona; John J. Ewing, Tarentum, all of Pa.

[73] Assignee: PPG Industries, Inc., Pittsburgh, Pa.

[21] Appl. No.: 575,231

[22] Filed: Jan. 30, 1984

[51] Int. Cl.³ .............................. C03B 23/023
[52] U.S. Cl. .......................... 65/29; 65/106; 65/273
[58] Field of Search .............. 65/106, 273, 374.11, 65/29

[56] References Cited

U.S. PATENT DOCUMENTS

| | | |
|---|---|---|
| 2,408,526 | 10/1946 | Minton . |
| 2,560,599 | 7/1951 | Ryan . |
| 2,570,309 | 10/1951 | Black . |
| 2,691,854 | 10/1954 | Rugg . |
| 3,144,319 | 8/1964 | Robinson . |
| 3,476,540 | 11/1969 | Ritter, Jr. et al. . |
| 3,586,492 | 6/1971 | McMaster . |
| 3,607,200 | 9/1971 | McMaster . |
| 3,741,743 | 6/1973 | Seymour . |
| 3,816,089 | 6/1974 | Seymour . |
| 3,846,104 | 11/1974 | Seymour . |
| 3,973,943 | 8/1976 | Seymour . |
| 4,246,313 | 1/1981 | Stengle, Jr. .................... 428/266 X |
| 4,274,858 | 6/1981 | Claassen et al. ............. 65/374.11 X |
| 4,282,026 | 8/1981 | McMaster et al. . |
| 4,421,482 | 12/1983 | McMaster . |

Primary Examiner—Arthur Kellogg
Attorney, Agent, or Firm—Andrew C. Siminerio; Edward I. Mates

[57] ABSTRACT

Apparatus for handling hot glass sheets comprises a rigid ring-like member of a composition that causes rejectable defects in a bent glass sheet when it contacts the hot glass sheet directly. Insulating material that does not mar the glass sufficiently to cause rejectable defects is used to cover the rigid member. However, no material known to date lasts forever. The present invention provides screen mesh reinforcement means within the thickness of the glass sheet engaging member to produce fine marks that do not cause rejection of the finished article to warn operating personnel to replace the hot glass sheet engaging member with a fresh hot glass sheet engaging member before the hot glass sheet engaging member becomes worn to the extent that the rigid member causes a rejectable defect. Clamping means is provided to replace a worn glass engaging member rapidly. Optionally, a cushion of fibrous ceramic material is interposed between the rigid member and the hot glass sheet engaging member to enable the glass engaging surface of the hot glass sheet engaging member to conform to the downwardly facing shaping surface of an upper vacuum mold.

1 Claim, 3 Drawing Figures

1

APPARATUS FOR PRESS SHAPING HOT GLASS SHEETS

BACKGROUND OF THE INVENTION

1. Field of the Invention

The present invention relates to the handling of hot glass sheets. More particularly, the present invention relates to a lifting mold especially useful for lifting glass sheets into vacuum engagement with the downward facing surface of a vacuum mold of curved configuration in a vacuum forming operation of the type depicted in U.S. Pat. No. 3,846,104 to Samuel L. Seymour wherein the glass sheets to be shaped are of irregular or non-rectangular outline or shaped to non-uniform elevational contours and weigh as much as or more than 50 pounds (23 kilograms).

The bending and lifting molds incorporated in such apparatus are of the outline type and often have a rigid rail of T-shaped section and ring-like outline. The rail may either be unitary or sectionalized and is shaped to conform to the outline of the glass sheet undergoing shaping to serve as a shaping mold. A heat-softened glass sheet is conveyed into a position above the ring-like mold when the latter is in a vertically recessed or lowered position. The ring-like mold then lifts the glass sheet when the latter is properly aligned vertically. The vertical movement of the outline ring-like shaping mold brings the hot glass sheet into close adjacency to an upper vacuum mold having a downward facing surface conforming throughout its extent to the shape desired for the glass sheet and approximating the outline shape provided by the ring-like mold.

Because of the extreme weight of the glass, it is necessary to make the ring-like mold of very heavy metal to develop the desired rigidity for the outline mold. It has been customary in the past to insulate the heavy material from direct contact with the glass. Such insulation reduces the effect of the high heat capacity of the ring-like mold to impart tension stress in the engaged glass sheet, which tension stress weakens the glass.

TECHNICAL BACKGROUND AND DESCRIPTION OF PATENTS OF INTEREST

When ring-like shaping molds in vacuum-forming apparatus of the type just described are heavy enough to provide the proper rigidity to avoid deformation of the mold, a considerable thickness of insulating material is required. Prior to the present invention, adhesives used to bond insulating material to the upper surface of a rigid ring-like member had to endure a long curing period in order to provide desired adhesion. Furthermore, by attaching an insulating material that wore with time, the glass sheets fabricated immediately after the insulating material was completely worn were damaged to such an extent that they could not be sold. The moment of complete wear could not be predicted in advance.

The following patents deal with means to insulate heat softened glass sheets from shaping molds.

U.S. Pat. No. 2,408,526 to Minton wraps an asbestos strand about a metal outline mold to insulate the glass from direct mold contact. The health problems involved with asbestos are well known. A different material is desirable.

U.S. Pat. No. 2,560,599 to Ryan uses staples to connect a fiberglass cloth cover to the sides of a shaping surface to secure the cover in unwrinkled relation to the shaping surface of a solid mold.

U.S. Pat. No. 2,570,309 to Black cements fiberglass fabric to the shaping surfaces of press bending molds. The cements are slow to cure to develop a desired degree of adhesion required for commercial production.

U.S. Pat. No. 2,691,854 to Rugg applies to an outline ring-like mold a covering of stove polish comprising carbon black and graphite suspended in a hydrocarbon vehicle and having a small amount of resin added to improve its adherence to the metal shaping surface of an outline mold. Such a covering would require too frequent replacement in applications of the type that are needed to lift a heavy glass sheet to engage an upper mold by vacuum.

U.S. Pat. No. 3,144,319 to Robinson uses spring-loaded grippers to secure the ends of a fiberglass cover to a press mold support frame so as to hold the cover in stretched unwrinkled relationship to the shaping surface of the mold. While the cover is readily replaceable, it does not include means to warn an operator of imminent complete wear of the cover.

U.S. Pat. No. 3,476,540 to Ritter provides outline mold segments of metal provided with a cover of refractory material that does not fuse to heated glass sheets. The manner of bonding the refractory material to the metal mold segments is not mentioned, but it is believed that a slow acting bonding adhesive is needed.

U.S. Pat. No. 3,586,492 to McMaster engages a supported glass sheet by a flexible metal screen that is suspended between spaced metal tabs forming the perimeter of an outline mold that conforms to a frame-like configuration around the outline of the glass sheet. The flexible metal screen forms a fine pattern on the hot glass from the first sheet fabricated during a bending campaign and does not warn of imminent complete wear, and, unless made of expensive stainless steel, rusts to mar the glass.

U.S. Pat. No. 3,607,200 to McMaster uses a metal frame means to support the outline of a glass sheet in a horizontal press bending apparatus.

U.S. Pat. No. 3,741,743 to Seymour uses at least two layers of wire mesh of different thickness secured between spaced, rigid members by wire to provide a low thermal capacity member in contact with the edge of a glass sheet supported at elevated temperatures. The screen mesh has sufficient rigidity to maintain its shape if supporting a much lighter glass sheet, but not enough to support heavier rear windows of present usage.

U.S. Pat. No. 3,816,089 to Seymour clamps a fiberglass cover for a ring-like shaping mold along its marginal portion to a mold support. This enables the cover to form a trampoline-like structure sufficient to support lighter glass sheets than present heavy auto rear windows.

U.S. Pat. No. 3,846,104 to Seymour uses a T-shaped rail with a fiberglass cover superimposed over the head of the T but does not describe the specific manner in which the cover is held in support relative to the rail.

U.S. Pat. No. 3,973,943 to Seymour discloses a composite ring-like member having a material of low heat transfer coefficient, reinforced with metal. The metal is spaced away from direct engagement with the glass.

U.S. Pat. No. 4,282,026 to McMaster encircles a ring-like member with a spring to space the glass sheet from direct engagement with the ring and makes almost point contact with each loop of the spacing spring.

U.S. Pat. No. 4,246,313 to Stengle discloses a high temperature resistant composition for engaging glass at high temperatures. The composite material of this patent comprises a substrate of a polymeric thermoset material such as polyaramid fibers or similar high temperature-resistant materials having a continuous coating or layer of solid film lubricant or glass release agent which essentially comprises an organic-inorganic silicone resin having a finely divided particulate filler therein. The polymeric fibrous substrate of this patent cannot be employed alone without a suitable heat-resisting coating for long-term, repeated handling of hot glass articles.

U.S. Pat. No. 4,421,482 to McMaster discloses a surface of uncoated, aromatic polyamide fibers which are stable at a sufficiently high temperature to directly engage and support glass sheets heated to a temperature of about 1100° to 1200° F. in the glass engaging surface of a generally rigid glass sheet handling apparatus such as a conveyor roll.

Despite the improvement of newly developed materials to withstand elevated glass temperatures, no material lasts forever. Therefore, it is necessary to periodically remove insulating materials used to prevent the direct contact between supported hot glass sheets and a rigid, high thermal capacity member of glass sheet engaging apparatus. It is also desirable to become aware of the need to replace the insulating material after the insulating material has been used for a considerable period and before it wears out completely and to provide a readily removable and readily replaceable cover for the mold shaping surface.

DESCRIPTION OF THE PRESENT INVENTION

It has now been found that it is desirable to cover a rigid member in the form of a high heat capacity shaping rail with a hot glass sheet engaging member composed of a phenolic resin or nitrile rubber containing an aromatic polyamide (commonly termed aramid) fiber filler further reinforced with wire mesh within its thickness over a rigid ring-like member used as a shaping mold. The wire mesh reinforcement provides structural reinforcement for the fiber filled phenolic resin or nitrile rubber, and when it extends beyond the sides of the shaping rail, it is capable of providing attachment means to attach the insulating material to the ring-like member, particularly when the ring-like member is of a T-shaped section. Furthermore, the wire reinforcement is incorporated within the hot glass sheet engaging member in sufficient depth within its thickness to indicate when the glass engaging member is worn to an extent that it requires replacement by providing a very fine marking on the glass only after the glass engaging member has been used for a long time, but before it completely wears out. The wire mesh reinforcement extends beyond the sides of the hot glass sheet engaging member and the extended portions are folded down to form extending portions rigidly clamped to the stem of the ring-like mold to enable the glass engaging member to be applied rapidly to the head of the cross section of the ring-like member in non-wrinkling relation thereto.

Optionally, the present invention also provides a compressible cushion of thermal insulation in sandwiched relation between the hot glass engaging member and the upper surface of the ring-like member of T-shaped section. Such an insulation cushion as provided in the optional feature of the present invention enables the glass engaging surface of the glass engaging member to flex locally in regions where the shaping rail differs in configuration from that of the vacuum mold in case the two are not shaped to exact conformity.

The clamping means of the present invention provides ready attachment enabling an operator to attach an insulating covering in non-wrinkling relation to a shaping rail of a ring-like mold. The wire mesh provides a warning when the insulating material is almost fully worn and before the hot glass sheet engaging member is sufficiently worn to expose a glass sheet directly to the rigid mold or the oxidized wire mesh that oxidizes on exposure, and causes the fabricated glass sheet to be a reject. Also, the mechanical clamp means avoids the need for a long curing cycle in order to adhere an insulating material to the upper surface of a ring-like shaping mold using conventional adhesives.

The present invention optionally incorporates a glass sheet engaging member that is rigidly secured in spaced relation to a rigid, heavy ring-like mold with a compressible insulation member interposed to make it possible for the glass engaging member to conform more closely to the shape of an upper vacuum mold even in regions where the ring-like mold does not conform exactly to the upper vacuum mold.

The present invention protects a heavy rigid ring-like mold from direct engagement with the hot glass in its preferred embodiment by a high temperature resistant material that is reinforced by fine wire mesh. The wire mesh extends beyond the ends of the hot glass sheet engaging member and is folded around the rigid ring-like mold for tight clamping thereto in spaced relation along the length of the ring-like mold to assure an unwrinkled configuration for the hot glass sheet engaging member. The very fine reinforcement screen mesh imparts a fine imprint which is barely noticeable by those well versed in the art only after the hot glass sheet engaging member has been used for an extended period to warn operating personnel of the need to replace the hot glass sheet engaging member before the latter wears away further and causes the article produced to be a reject.

These and other benefits of the present invention will be made more obvious in the light of a description of this invention that follows.

BRIEF DESCRIPTION OF THE DRAWINGS

In the drawings that form part of a description of a preferred embodiment of the present invention which follows.

DESCRIPTION OF THE PREFERRED EMBODIMENT

Figure 1:
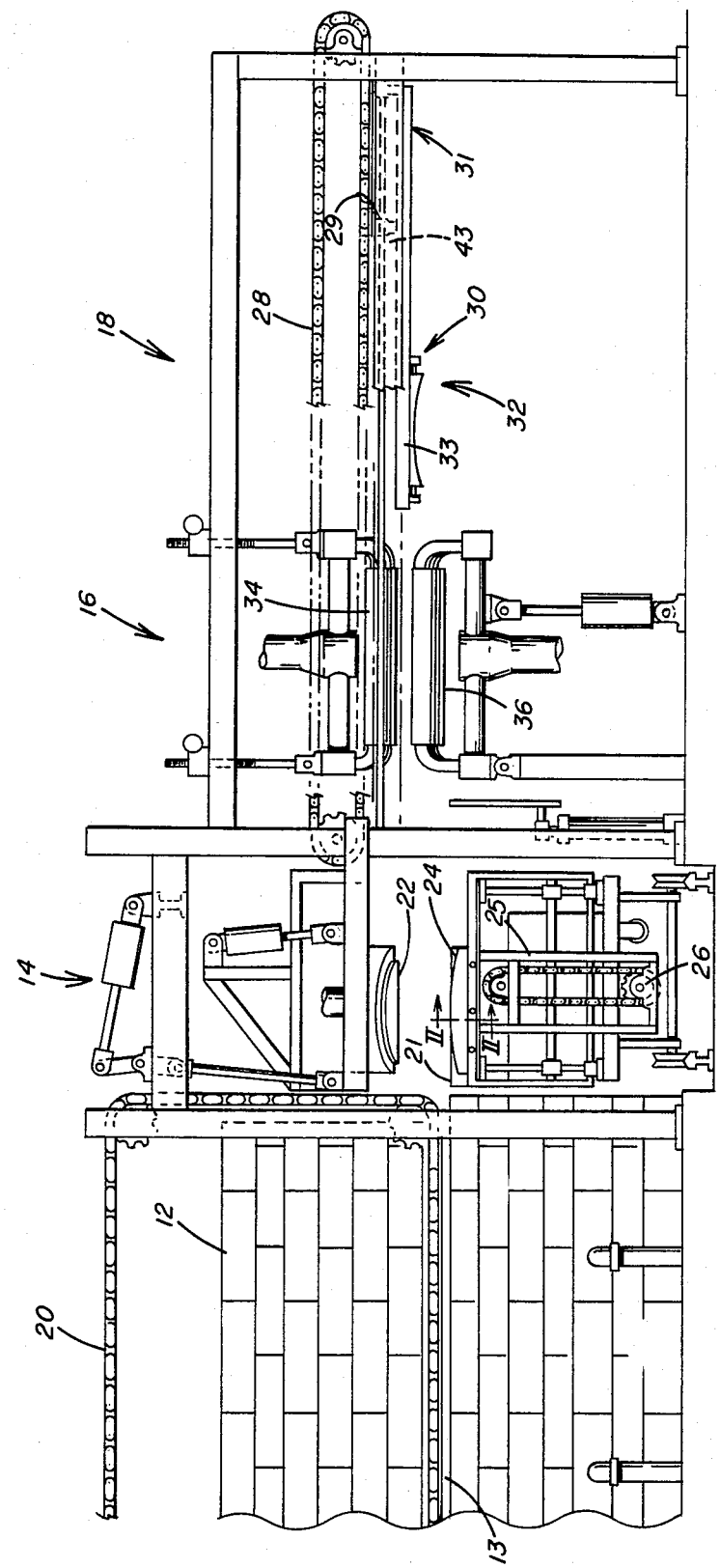
FIG. 1 is a longitudinal view of glass sheet shaping and tempering apparatus incorporating a ring-like mold conforming to the present invention.
Figure 2:
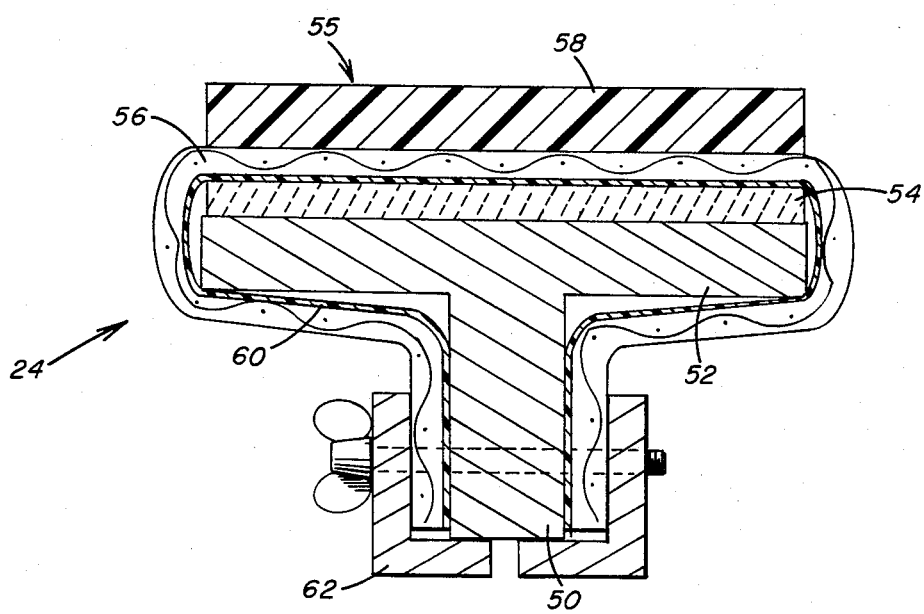
FIG. 2 is a view taken along the lines II—II of FIG. 1 and is a cross-sectional view of a T-shaped rail that is modified according to the present invention, the rail forming part of a ring-like mold.

Referring to the drawings, and particularly FIG. 1, apparatus similar to that of U.S. Pat. No. 3,846,104 to Seymour, for which the present invention is especially suited, is disclosed. The full disclosure of the aforesaid patent is incorporated by reference for anyone requiring further details. In the present description, the essential elements will be described to provide background for the present invention.

The illustrated apparatus includes a loading station (not shown) which is at the entrance or upstream end of a glass sheet heating furnace 12 containing a porous bed 13 of ceramic material having inlet and outlet openings distributed therethrough in such a manner that hot gas is supplied to the surface of the porous bed 13 at a pressure sufficient to float a succession of glass sheets in closely spaced relation to the bed to form a series of glass sheets to be treated. The upper surface of the bed is flat and the gas provided at an elevated temperature sufficient to heat the glass to a temperature sufficient for shaping and applying at least a partial temper. In addition, overhead radiant heaters of gas or electric may be provided to assure that glass sheets are heated to their deformation temperature during their transport through the furnace 12.

A glass shaping station 14 is located beyond the exit end of the furnace 12. A glass cooling station 16 and a glass unloading station 18 are disposed beyond the furnace 12. A first conveyor 20 comprising a pair of opposing chains interconnected by cross members that engage the edge of different glass sheets conveyed through the furnace to the shaping station is used to transport the glass sheets while they are floated on the hot gas provided to the porous bed 13 and are irradiated by the radiant heaters disposed throughout the length of the furnace in facing relation to the glass sheets.

The first conveyor 20 brings glass sheets into position for transfer to a shuttle means such as the type depicted in reference number 40 of U.S. Pat. No. 3,607,200 to McMaster. The glass arrives at a position in the glass shaping sation 14 intermediate an upper vacuum mold 22 having a continuous downwardly directed lower surface provided with foramina connected to a vacuum chamber and a lower ring-type mold 24 whose outline conforms to the shape of the lower surface of the upper vacuum mold 22. The ring-like mold is also known as a lifting mold. The latter is supported by a skeleton support 25 mounted for vertical movement controlled by lifting and lowering means 26.

The shuttle, which was omitted from the drawing because it is part of the prior art and forms no part of the present invention, delivers a glass sheet into position above a porous bed extension 21 which is surrounded by the ring-like mold 24 when the latter is lowered. The lifting and lowering means 26 cause the lower ring-like mold 24 to move between a lowered position below the upper surface of the porous bed extension 21 and a raised position wherein a glass sheet supported on the ring-like mold 24 is lifted from the porous bed extension 21 into close adjacency to the upper vacuum mold 22.

A second conveyor 28 having an upstream end near the glass shaping station 14 and a downstream end at the unloading station 18 is also provided with a pair of spaced chains similar to the chains of the first conveyor 20. The spaced chains move in unison to actuate movement of a pair of lugs 29 (shown attached to the lower run of each chain of the second conveyor 28). Each lug 29 is part of a transversely spaced pair of lugs connected to a carriage 31. The carriage supports a shaped glass sheet support member 32 of outline, elongated ring-like structure whose upper edge conforms to the glass outline shape, at the upstream portion 33 of the carriage 31. The support member 32 may be either a continuous ring or a discontinuous ring-like member and is preferably constructed of the type of composite ring-like member disclosed in U.S. Pat. No. 3,973,943 to Seymour comprising a reinforced metal rail of ring-like configuration that embraces and supports a high temperature resistant insulating material that extends upward from its embraced portion to the glass and keep the glass in spaced relation to the metal reinforcement.

Each carriage 31 is apertured to receive a slide rail 43 and the downstream ends 33 of the carriages are interconnected to one another to form support structure for the supported shaped glass sheet support member 32. The length of the slide rail 43 which is received by apertures in each carriage 31 is such that the glass sheet support member 32 is capable of movement between an upstream position immediately beneath the upper vacuum holder 22 at the shaping station 14, an intermediate position in cooling station 16 (which preferably defines a center of linear reciprocation for the glass sheet support member 32), and an unloading position at the unloading station 18 that is depicted in FIG. 1.

The cooling station 16 comprises an upper set of nozzles 34 and a lower set of nozzles 36. Air under pressure is provided to the upper and lower sets of nozzles when the glass sheet support member 32 supports a shaped glass sheet therebetween. Preferably, the glass sheet support member 32 is reciprocated so as to provide continuous relative movement between the glass sheet and the nozzles through which cold air is imparted at a rate sufficient to cause the glass sheet to develop a temper of a desired intensity.

In a typical shaping and tempering operation, the leading glass sheet in a series of sheets is conveyed through the furnace where its temperature reaches a desired elevated temperature range. The glass sheet is transferred into the shaping station 14 with the lower ring-like mold 24 in its lowered position surrounding the porous bed extension 21. When the glass sheet arrives in proper position between the ring-like mold and the upper vacuum mold 22, the lifting and lowering means 26 raises the lower ring-like mold 24 and suction is applied to the upper vacuum mold 22 to lift the heat-softened glass sheet and to shape it to conform to the downwardly facing shaping surface of the upper vacuum mold 22. The lower ring mold 24 is then lowered to permit the glass sheet support member 32 to move into position immediately below the vacuum mold 22. Vacuum is stopped and the glass sheet is permitted to drop onto the upper surface of the glass sheet support member 32. The carriages 31 retract in unison to move the glass sheet support member 32 into position between the upper nozzles 34 and the lower nozzles 36 where cold air is applied against the shaped glass sheet supported on the glass sheet support member 32 for sufficient time to impart the desired temper in the glass.

An important feature of the apparatus of this invention is to provide a glass engaging member 55 that avoids marking the glass during its lifting from the porous bed extension into close adjacency to the upper vacuum mold for essentially the entire lifetime of the member. Unless the lower ring-like mold 24 and the upper vacuum mold 22 are of exact shape, the glass becomes pinched and otherwise marred when sandwiched between the upper vacuum mold 22 and the lower ring-like mold 24. It is virtually impossible for the vacuum mold and the ring-like mold to have metal shaping surfaces of exact conforming configurations so that it is desirable to have a cushion of compressible fibrous material that yields in response to any deviations between the shape of the vacuum mold and the shape of the lifting mold of outline configuration. It is also imperative that the glass to be insulated thermally from direct contact with a metal rail with a material that has high thermal durability and does not mar the glass surface as long as it lasts. It is also desirable to have means to warn an operator when a glass engaging member is almost completely worn and to provide means for rapidly replacing one glass engaging member with another before the glass engaging member becomes completely worn.

The present invention provides the desired results by modifying a conventional rigid T-shaped mold 24, particularly when glass sheets having a weight in excess of about 50 pounds (23 kilograms) are supported around their marginal portion for lifting and bending.

The T-shaped shaping rail of the lower ring mold 24 comprises a rigid member having a stem 50 and a head 52. A compressible cushion 54 is adhered of a compressible material such as a fibrous ceramic material called FIBERFRAX® or a fibrous silica tape directly over the head 52 to provide a yielding cushion capable of modifying its thickness locally when sandwiched between portions of molds that do not conform exactly. The cushion is usually ⅛ to ¼ inch (3 to 6 millimeters) thick and is covered by a hot glass sheet engaging member 55 in a thickness range of 1/16 inch (1.6 mm) to ⅛ inch (3.2 mm) that is commercially available as Klingersil 4408-W ungraphited, which contains aramid fiber filler in an essentially nitrile rubber matrix. A wire screen 56 is embedded within the thickness of the glass engaging member 55 to divide the latter into a thick upper portion 58 and a thin lower portion 60. Preferably, the wire mesh is 0.25 mm diameter wire arranged in 12×12 mesh per square inch (5×5 mesh per square centimeter).

Figure 3:
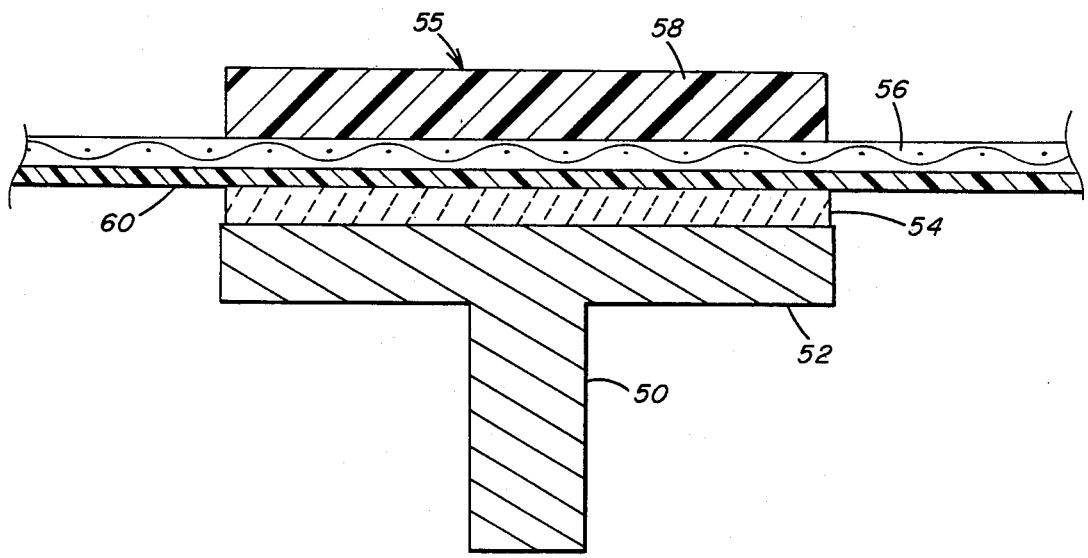
FIG. 3 is a view similar to FIG. 2 showing how the T-shaped rail and its modifying means are arranged to form the modified rail for the ring-like mold of the present invention.

The cushion 54 is applied to the head 52 optionally using adhesive such as a silicone adhesive or adhesive backed tape, which needs to maintain the cushion in place only until the entire structure of the modified T-shaped shaping mold is completed. Then, the glass engaging member 55, supplied in the form of a wire-reinforced sheet, is cut into strips wider than the head 52. The wire screen 56 is embedded within the glass engaging member 55 in offset relation to the thickness of the glass engaging member. The glass engaging member 55 is laid over the top of the cushion 54 in such a manner that a thicker portion 58 of the thickness of the aramid fiber filled nitryl rubber is above the wire screen 56 and only a thin portion 60 is below the embedded wire screen 56. Then, the glass engaging member 55 is cut along lines aligned with the side edges of the head 52 and the flanking upper portions 56 of the glass engaging member 55 beyond the cuts are removed to approximately the depth of the screen wire, leaving an arrangement shown in FIG. 3. The flanking portions beyond the cuts fold readily around the head 52 and along the stem 50. Clamps 62 rapidly secure the flanking portions to the stem 50 in a manner that permits rapid removal and replacement.

When a ring-like mold 24 is modified in the manner just described, the glass engaging member 55 is composed of a material that does not mar hot, heavy glass sheets and wears quite slowly when used in the shaping of heavy glass sheets at a temperature as high as 1200° to 1300° F. (650° to 700° C.). A production run lasting three weeks did not require replacement of a hot glass sheet replacement member 55. However, when the hot glass sheet engaging member 55 wears to the point that the screen wire 56 becomes exposed, a light marking insufficient to cause the resulting shaped and tempered glass sheet to be rejected appears to warn the inspectors that the glass engaging member 55 is almost entirely worn, so that it becomes necessary to remove the glass engaging member 55 by unclamping the clamp 62 and replacing it with another glass engaging member 55 in a like manner. Failure to remove and replace the glass engaging member in time will cause succeeding glass sheets to develop more severe marks as the wire mesh contacting the glass oxidizes on exposure and oxidized wire marks the glass sufficiently to cause an expensive glass product to be rejected due to chipping or marking due to direct contact. Eventually, the oxidized wire mesh breaks.

The exact materials for the cushion 54 and for the glass sheet engaging member 55 need not be the material specified in the description of the specific embodiment. Any suitable, well known matrix for the polyamide fiber filler that does not mar hot glass may be substituted for the nitrile rubber in the glass sheet engaging member 55 (for example, certain phenolic resins) and any compressible fibrous material having requisite heat insulation properties and capable of withstanding the cyclical environmental temperature involved in a mass production bending operation may be used for the cushion 54.

The form of the invention described and illustrated herein represents a description of an illustrative preferred embodiment thereof. It is understood that various changes may be made without departing from the gist of the invention defined in the claimed subject matter that follows.

What is claimed is:

1. A method of bending hot glass sheets comprising:
   providing a rigid, lower mold of ring-like configuration, the mold having a composite glass sheet supporting member having an outer sheet engaging layer of a heat insulating material that does not mar hot glass at elevated temperatures and a wire mesh reinforcement means, for imprinting a heated glass sheet, embedded within the thickness of the sheet engaging layer to separate said glass sheet supporting member into a upper portion that initially contacts the hot glass sheet and a lower portion for imparting a fine imprint on hot glass upon contact therewith, to indicate deterioration of the glass sheet supporting member without marring the hot glass sheet to reject same due to excessive marking;
   heating a glass sheet to temperature sufficient to bend the sheet and to imprint the sheet when exposed to the wire mesh reinforcement means;
   positioning the heated glass sheet on the glass sheet supporting member;
   lifting the mold to lift the heated glass sheet towards an upper vacuum mold;
   engaging the hot glass sheet by vacuum against the upper vacuum mold to bend the hot glass sheet;
   removing the hot glass sheet from engagement with the vacuum mold;
   repeating said heating, positioning, lifting, engaging and removing steps with subsequently heated glass sheets;
   examining selected ones of the bent sheets after the removing step to determine if the bent sheet has a fine imprint from said wire mesh reinforcement means indicating excessive wearing of said glass sheet supporting member and the need to replace same with a new member;
   practicing said providing step after the practice of said examining step determines whether a bent glass sheet has a fine imprint; and thereafter practicing said repeating and examining steps.

* * * * *